(12) United States Patent
Bruns

(10) Patent No.: US 6,813,082 B2
(45) Date of Patent: Nov. 2, 2004

(54) WAVEFRONT ABERRATOR AND METHOD OF MANUFACTURING

(75) Inventor: Donald G. Bruns, San Diego, CA (US)

(73) Assignee: Ophthonix, inc., San Diego, CA (US)

( * ) Notice: Subject to any disclaimer, the term of this patent is extended or adjusted under 35 U.S.C. 154(b) by 157 days.

(21) Appl. No.: 09/875,447

(22) Filed: Jun. 4, 2001

(65) Prior Publication Data

US 2002/0080464 A1 Jun. 27, 2002

Related U.S. Application Data

(60) Provisional application No. 60/253,418, filed on Nov. 27, 2000.

(51) Int. Cl.$^7$ ................................................. G02B 5/00
(52) U.S. Cl. ...................... 359/589; 359/237; 359/290; 359/580; 359/291; 359/892; 359/893; 349/2; 349/4; 349/56; 349/61; 349/62; 264/1.31; 264/1.32; 264/1.36; 264/1.37; 264/1.38; 264/482; 264/494
(58) Field of Search ............................ 349/4, 2, 56, 61, 349/62; 359/237, 290, 580, 589, 291, 892, 893; 264/1.31, 1.32, 1.36, 1.37, 1.38, 482, 494, 706.02; 356/239.1, 239.2

(56) References Cited

U.S. PATENT DOCUMENTS

| | | |
|---|---|---|
| 3,933,411 A | 1/1976 | Winner |
| 3,973,837 A | 8/1976 | Page |
| 4,268,133 A | 5/1981 | Fischer et al. |
| 4,666,236 A | 5/1987 | Mikami et al. |
| 4,810,070 A | 3/1989 | Suda et al. ................. 350/413 |
| 4,848,894 A | 7/1989 | Buser et al. |
| 4,869,587 A | 9/1989 | Breger |
| 4,874,234 A | 10/1989 | Wichterle |
| 4,996,123 A | 2/1991 | Nomura et al. |
| 5,054,888 A | 10/1991 | Jacobs et al. |

(List continued on next page.)

FOREIGN PATENT DOCUMENTS

| | | |
|---|---|---|
| EP | 0 472 384 A2 | 2/1992 |
| EP | 0 949 529 A2 | 10/1999 |
| GB | 1045065 | 10/1966 |
| JP | 60-175009 | 9/1985 |
| WO | WO 98/53360 | 11/1998 |
| WO | WO 9913361 | 3/1999 |
| WO | WO 00/41650 | 7/2000 |
| WO | WO 01/02896 | 1/2001 |
| WO | WO 01/89424 A1 | 11/2001 |
| WO | WO 02/32297 A2 | 4/2002 |

OTHER PUBLICATIONS

Moretti, Michael, "New laser–based technologies incubate," Opthamology News, Nov. 29, 2001.
International Search Report dated Nov. 26, 2003 for application No. PCTUS03/24150, filed on Jul. 7, 2003.

Primary Examiner—John J. Zimmerman
Assistant Examiner—Wendy Boss
(74) Attorney, Agent, or Firm—Knobbe Martens Olson & Bear LLP

(57) ABSTRACT

The wavefront aberrator of the present invention includes a pair of transparent windows, or plates, separated by a layer of monomers and polymerization initiator, including a broad class of epoxies. This monomer exhibits a variable index of refraction across the layer, resulting from controlling the extent of its curing. Curing of the epoxy may be made by exposure to light, such as ultraviolet light. The exposure to light may be varied across the surface of the epoxy to create a particular and unique refractive index profile.

26 Claims, 7 Drawing Sheets

U.S. PATENT DOCUMENTS

| | | |
|---|---|---|
| 5,080,472 A | 1/1992 | Gupta .................. 359/652 |
| 5,100,589 A | 3/1992 | Ticknor |
| 5,114,628 A | 5/1992 | Hofer et al. |
| 5,116,684 A | 5/1992 | Fretz, Jr. et al. |
| 5,148,205 A | 9/1992 | Guilino et al. ............. 351/159 |
| 5,198,844 A | 3/1993 | Roffman et al. |
| 5,229,797 A | 7/1993 | Futhey et al. ............... 351/161 |
| 5,266,352 A | 11/1993 | Filas et al. |
| 5,343,260 A | 8/1994 | Henry et al. |
| 5,372,755 A | 12/1994 | Stoerr et al. |
| 5,433,810 A | 7/1995 | Abrams |
| 5,448,312 A | 9/1995 | Roffman et al. |
| 5,528,321 A | 6/1996 | Blum et al. |
| 5,585,968 A | 12/1996 | Guhman et al. |
| 5,606,378 A | 2/1997 | Van Meurs |
| 5,608,471 A | 3/1997 | Miller |
| 5,617,154 A | 4/1997 | Hoffman |
| 5,650,837 A | 7/1997 | Roffman et al. |
| 5,715,031 A | 2/1998 | Roffman et al. |
| 5,771,088 A | 6/1998 | Perrott |
| 5,777,719 A | 7/1998 | Williams et al. |
| 5,786,883 A | 7/1998 | Miller et al. |
| 5,835,192 A | 11/1998 | Roffman et al. |
| 5,861,934 A | 1/1999 | Blum et al. |
| 5,864,379 A | 1/1999 | Dunn |
| 5,872,613 A | 2/1999 | Blum et al. |
| 5,880,809 A | 3/1999 | Lieberman et al. |
| 5,929,969 A | 7/1999 | Roffman |
| 5,949,521 A | 9/1999 | Williams et al. |
| 5,953,098 A | 9/1999 | Lieberman et al. |
| 5,956,183 A | 9/1999 | Epstein et al. |
| 5,998,096 A | 12/1999 | Umemoto et al. |
| 6,027,672 A | 2/2000 | Weitzel et al. |
| 6,081,632 A | 6/2000 | Yoshimura et al. |
| 6,086,204 A | 7/2000 | Magnante .................. 351/212 |
| 6,089,711 A | 7/2000 | Blankenbecler et al. |
| 6,109,749 A | 8/2000 | Bernstein |
| 6,176,580 B1 | 1/2001 | Roffman et al. |
| 6,240,226 B1 | 5/2001 | Presby et al. |
| 6,274,288 B1 | 8/2001 | Kewitsch et al. |
| 6,319,433 B1 | 11/2001 | Kohan |
| 6,379,005 B1 | 4/2002 | Williams et al. |
| 6,450,642 B1 * | 9/2002 | Jethmalani et al. |
| 6,499,843 B1 | 12/2002 | Cox et al. .................. 351/246 |
| 2002/0080464 A1 | 6/2002 | Bruns |
| 2002/0196412 A1 | 12/2002 | Abitbol .................... 351/246 |
| 2003/0081172 A1 | 5/2003 | Dreher |

* cited by examiner

WAVEFRONT ABERRATOR AND METHOD OF MANUFACTURING

RELATED APPLICATION

This application claims priority to U.S. Provisional Patent Application No. 60/253,418, filed Nov. 27, 2000.

BACKGROUND OF THE INVENTION

In traditional optical systems having reflecting and refracting surfaces, it is common to assume that the light passing through the system is limited to paraxial rays, specifically, rays that are near the optical axis and are sustained within small angles. However, practical optical systems rarely are limited to paraxial rays, and thus, the actual images assumed by gaussian optics often depart from the "perfect" image. This departure from the "perfect" image results in the introduction of distortion into the optical system, called aberrations. These aberrations are most problematic in small focal ratio optical systems where the angle from the optical axis is larger.

In a monochromatic optical system with only spherical surfaces, there are five (5) basic ray and wave aberrations, namely, spherical aberrations, coma, astigmatism, curvature of field, and distortion. Optical systems for use with multi-chromatic light have an additional source of distortion, namely, chromatic aberration.

Because the distortion introduced by aberrations into an optical system significantly degrades the quality of the images on the image plane of such system, there are significant advantages to the reduction of those aberrations. Various techniques are often used to minimize the aberrations. For example, in order to minimize spherical aberrations or coma, a lens may be "bent" to have different radii of curvature on opposite sides while maintaining a constant focal length, such as is contemplated by using the Coddington shape factor. Also, a pair of lenses, where one glass lens has a positive focal length, and the other made from a different glass has a negative focal length, are used together to correct spherical aberrator. One example of this technique is the "doublet" lens in which the two lenses have the same radius of curvature on the facing sides, and are cemented together.

Despite the available techniques to minimize the various aberrations, it is often difficult to simultaneously minimize all aberrations. In fact, corrections to an optical system to minimize one type of aberration may result in the increase in one of the other aberrations. Typically, one may decrease coma, at the expense of increasing spherical aberrations. Moreover, because it is often necessary to measure the aberrations only after an optical system is constructed due to additional aberrations from manufacturing or assembly tolerances, the creation of an optical system with minimal aberration typically requires several reconstructions before a suitable system is developed.

In complex optical systems, in addition to traditional aberration correction, it is often advantageous to create an optical element which generates a unique wavefront phase profile. Typically, these unique optical elements have been created by sophisticated grinding and polishing of traditional lenses. However, this method of manufacturing a unique optical element requires a significant amount of time and expertise, and results in a high cost of manufacturing the optical element.

Consequently, a need exists for the creation of an optical element which can generate a unique wavefront phase profile, and that can simultaneously minimize the chosen aberrations within an optical system.

SUMMARY OF THE INVENTION

The wavefront aberrator of the present invention includes a pair of transparent windows, or plates, separated by a layer of a monomers and polymerization initiators, such as epoxy. This epoxy exhibits a variable index of refraction as a function of the extent of its curing. Curing of the epoxy may be made by exposure to light, such as ultraviolet light. The exposure to light may be varied across the surface of the epoxy to create a particular and unique wavefront retardation profile such that when an ideal plane wave passes through the wavefront aberrator, a predetermined change of the wavefront profile can be affected by the wavefront aberrator device. Conversely, if a distorted wavefront is known, such as by measuring the wavefront with a Hartmann/Shack sensor, a correction of such aberrated or distorted wavefront aberration may be achieved by first producing a complementary wavefront aberrator device such that passing the abnormal wavefront through the wavefront aberrator device, a plane wave emerges.

One method of creating the wavefront aberrator of the present invention includes the exposure of the epoxy to an array of light emitting diodes (LEDs). These LEDs may be selectively illuminated such that different portions of the epoxy are exposed to different levels of illumination. This variance in illumination results in the creation of a wavefront aberrator having a varying index of refraction across its surface, and may include the formation of multiple sub-regions, where the index of refraction of the cured epoxy in a sub-region has a constant index of refraction, with the index of refraction varying between adjacent sub-regions.

An alternative method of creating the wavefront aberrator of the present invention includes the exposure of the epoxy to an array of LEDs through a demagnifier lens. In this manner, the LEDs may create a curing pattern which is then focussed onto the surface of the epoxy to create a similar, yet smaller, version of the curing pattern to provide for reduced-sized wavefront aberrators.

Yet another alternative method of creating the wavefront aberrator of the present invention includes the creation of a curing pattern by the transmission of light through a liquid crystal display (LCD). A non-coherent light source may be positioned adjacent to a diffuser to create a diffused light source. This diffused light may then be transmitted through a LCD containing a curing pattern, and onto a wavefront aberrator. As the epoxy is exposed, the curing pattern on the LCD creates the desired refractive index profile. New patterns may be generated by changing the pattern on the LCD.

A sensor may be placed beneath the wavefront aberrator to monitor the transmitted image of the curing pattern. The output of this sensor may be used to actively modulate the transmission of light through the LCD to create a wavefront aberrator having a desired refractive index profile, and to provide for an active monitor and control of the curing of each sub-region of the wavefront aberrator.

Another alternative method of creating the wavefront aberrator of the present invention includes the creation of a curing pattern by the selective illumination of portions of the epoxy using a point light source, such as a laser. This selective illumination may be accomplished by rastering a portion of the surface of the epoxy, varying the speed and/or intensity of the light source to vary the curing of the epoxy. Alternatively, the light source could trace particular curing patterns directly onto the wavefront aberrator at various speeds and/or intensities of light, such as by raster or vector scanning the curing pattern onto the aberrator. Also, a positive or negative, or "contact print," containing a particular wavefront retardation design may be positioned adjacent the wavefront aberrator and exposed to a diffused or collimated light to create the desired refractive index profile.

DETAILED DESCRIPTION OF A PREFERRED EMBODIMENT

Figure 1:
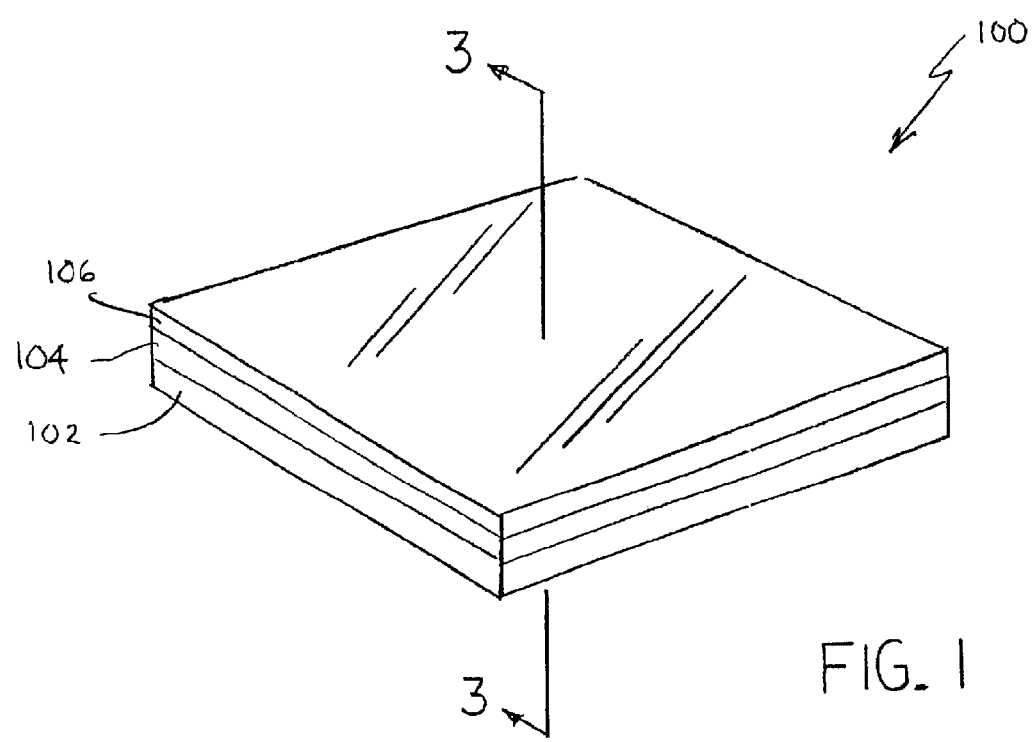
FIG. 1 is a perspective view of the wavefront aberrator of the present invention showing a layer of epoxy sandwiched between an upper transparent cover and a lower transparent cover.

Referring initially to FIG. 1, a perspective view of a preferred embodiment of the wavefront aberrator of the present invention is shown and generally designated 100. Aberrator 100 includes a lower transparent cover 102, an epoxy layer 104, and an upper transparent cover 106.

The shape of aberrator 100 is shown in FIG. 1 having square covers 102 and 106. It is to be appreciated, however, that the shape of the aberrator 100 shown in FIG. 1 is merely exemplary, and that any shape may be used while not departing from the present invention. Also, for purposes of illustration, the transparent covers 102 and 106 are shown in FIG. 1 as being substantially planar. However, it is to be appreciated that the covers 102 and 106 may be curved to provide a non-planar aberrator 100.

Figure 2:
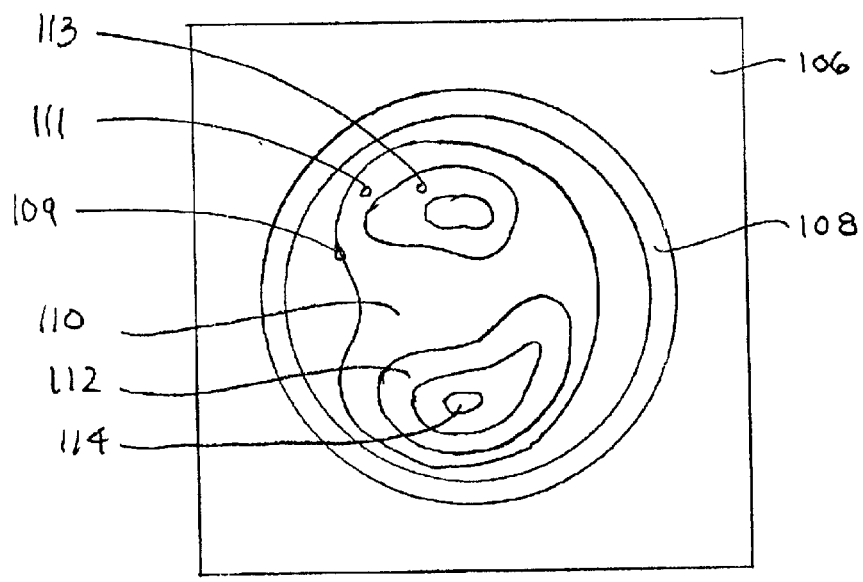
FIG. 2 is a top view of the wavefront aberrator of the present invention showing a circular barrier within the epoxy layer, and the epoxy layer formed within the circular barrier confining the epoxy within a predetermined volume and having a variety of refractive index profiles between different sub-regions.

Referring to FIG. 2, a top view of the wavefront aberrator 100 of the present invention is shown. A barrier, such as circularly-shaped barrier 108, may be positioned within the epoxy layer 104 to retain the placement of the epoxy 104 between the upper transparent cover 106 and the lower transparent cover 102.

Epoxy 104 is, in a preferred embodiment, a light-curable resin comprised of monomers and polymerization initiators. The refractive index of the resin changes as the resin is cured, and it varies between locations within the resin layer depending on the extent of curing of the epoxy. The extent of curing is determined by the percentage of cross-linking between the monomers within the epoxy. Suitable resins include VLE-4101 UV-Visible Light Cure Epoxy, available from Star Technology, Inc., or Optical Adhesive ·63, U.V. Curing, available from Norland Products, Inc. Typically, these resins are curable by exposure to UV or visible light radiation in the range of 300 to 550 nanometers (300–550 nm). Generally, the present invention applies to any type of epoxy that exhibits an index of refraction change upon curing and the corresponding curing light source may have wavelengths ranging between 300 nm and 3000 nm.

It is to be appreciated that many other suitable resins exist which exhibit a similar change in its index of refraction upon exposure to light. Other monomers that polymerize into long-chain molecules using photo-initiators may be used in the present invention. For example, a suitable monomer may be chosen from the family of epoxides, urethanes, thiolenes, acrylates, cellulose esters, or mercapto-esters, and a broad class of epoxies. Also, for example, a suitable photo-initiator may be chosen from chosen from alpha cleavage photoinitiators such as the benzoin ethers, benzil ketals, acetophenones, or phosphine oxides, or hydrogen abstraction photoinitiators such as the benzophenones, thioxanthones, camphorquinones, or bisimidazole, or cationic photoinitiators such as the aryldiazonium salts, arylsulfonium and aryliodonium salts, or ferrocenium salts. Alternatively, other photoinitiators such as the phenylphosphonium benzophene salts, aryl tert-butyl peresters, titanocene, or NMM may be used.

In the present invention, a light source containing a particular wavelength irradiates the monomer layer which activates the photo-initiator and begins the curing process within the epoxy. The curing process results in a corresponding change of the index of refraction within the resin. However, it is also to be appreciated that terminating the exposure to the particular wavelength of light ceases the curing of the epoxy, and ceasing the change of the index of refraction exhibited by the epoxy. In this manner, a aberrator 100 of the present invention may be formed by exposing certain portions of the resin 104 to a light source which varies with time and position, resulting in an aberrator having a varied index of refraction across its surface.

From FIG. 2, a variety of refractive index profiles are shown to be formed in resin layer 104. More specifically, different refractive index profile is illustrated by regions 110, 112, and 114, such that aberrator 100 includes three (3) distinct levels of refractive index.

It is to be appreciated that the incorporation of three (3) different levels of refractive index in FIG. 2 is merely exemplary, and the present invention contemplates the incorporation of any number of refractive index profiles, and that those different profiles may be formed within epoxy layer 104 to have virtually any shape or local curvature. Moreover, the epoxy layer 104 may be considered to be an array of pixels, such as pixels 109, 111, 113, which may each be selectively illuminated and cured to exhibit a particular index of refraction.

Figure 3:
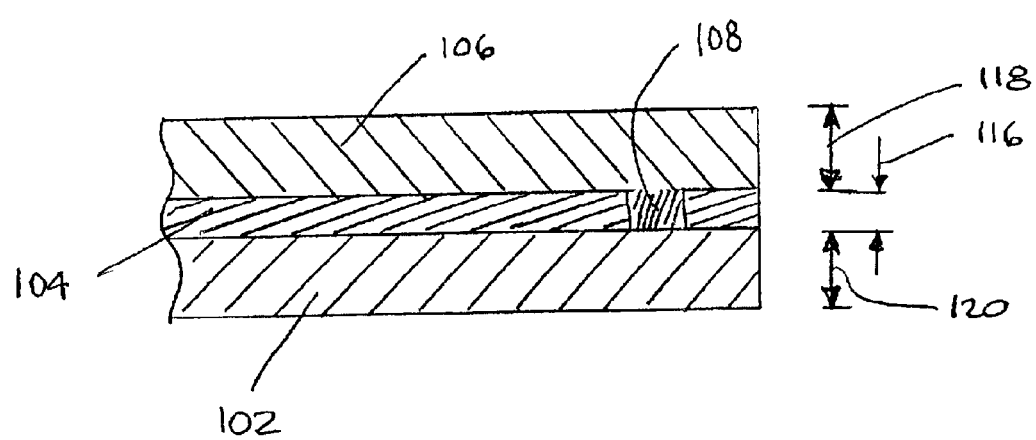
FIG. 3 is a cross-sectional view of the wavefront aberrator of the present invention taken along line 3—3 of FIG. 1, and showing the positioning of the epoxy layer between the upper and lower transparent covers.

Referring now to FIG. 3, a cross-sectional view of the wavefront aberrator of the present invention taken along line 3—3 of FIG. 1 is shown. Epoxy layer 104 is sandwiched between the upper transparent cover 106 and the lower transparent cover 102, and held in place by barrier 108. The enclosed volume of epoxy layer 104 is determined by the size of the barrier 108, and the distance between the upper transparent cover 106 and the lower transparent cover 102. In a preferred embodiment, the thickness 116 of the epoxy layer 104 is approximately 0.005 inches (0.125 mm), and the thicknesses 118 of the upper transparent cover 106 is approximately 0.025 inches (0.625 mm), and the thicknesses 120 of the lower transparent cover 102 is approximately 0.025 inches.

In a preferred embodiment, upper transparent cover 106 and lower transparent cover 104 are formed from a rigid transparent material, such as glass or plastic. While glass provides a stable platform for the formation of the refractive index profile, such rigidity is not necessary. In fact, covers 102 and 106 may be made from a flexible material, such as a transparent polymer. A suitable transparent polymer may include, but not be limited to, mylar film, polycarbonate film, or acetate film. Use of such materials results in a flexible aberrator having a distinct refractive index profile.

METHODS OF MANUFACTURING

Figure 4:
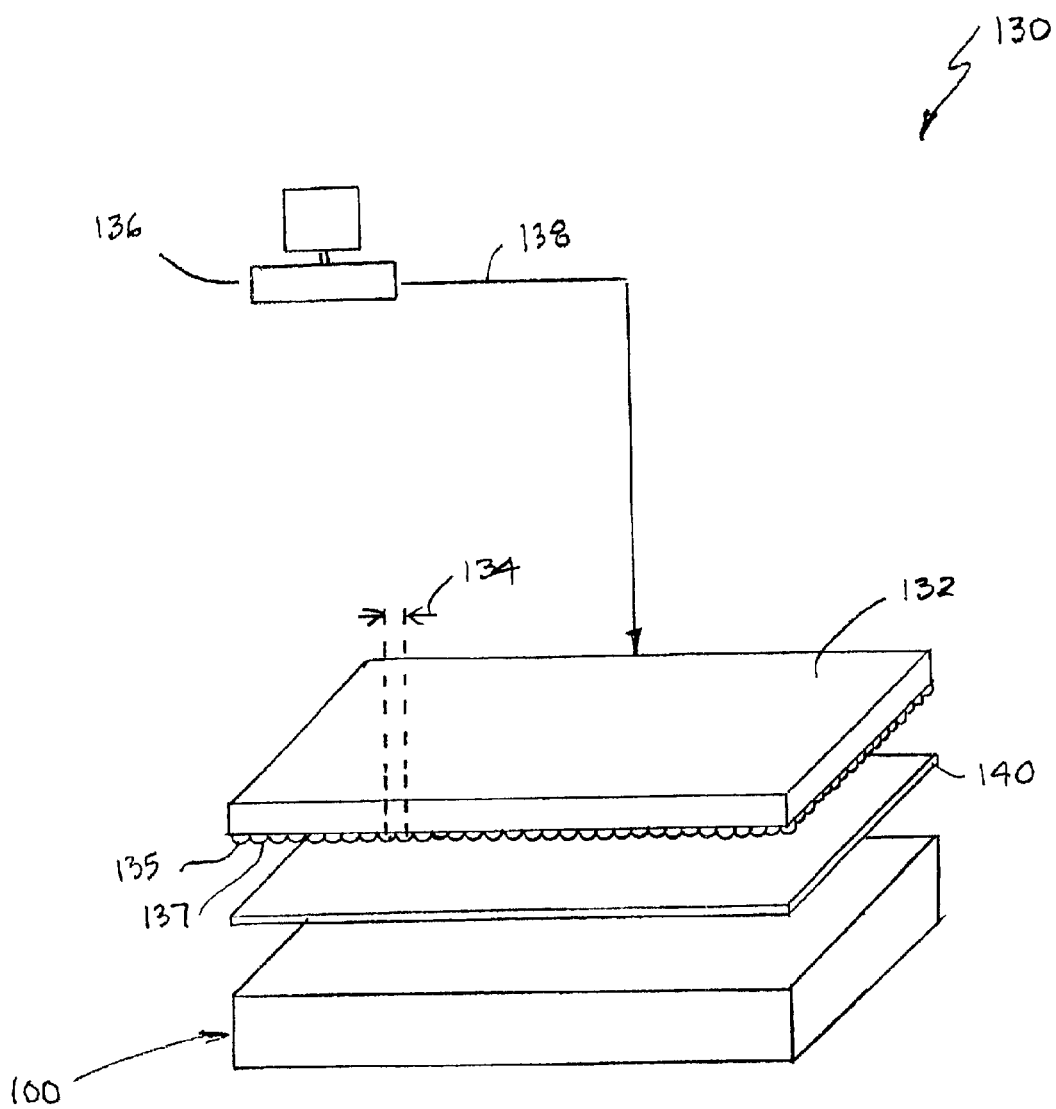
FIG. 4 is a system for manufacturing the wavefront aberrator of the present invention showing a computer controlled light emitting diode (LED) array panel generating a curing pattern which is directed through a diffuser element onto a wavefront aberrator to selectively cure the epoxy to create a particular, pre-determined refractive index profile.

Referring to FIG. 4, a system for manufacturing the wavefront aberrator of the present invention is shown and generally designated 130. System 130 includes a light emitting diode (LED) array panel 132 having a number of diodes 135, 137, separated from adjacent diodes by a distance 134, and controlled by a computer 136 through interface 138. In a preferred embodiment, the distance 134 between diodes 135 and 137 varies, and may typically be approximately 0.125 inches (3.175 mm), though alternative distances may be used. A diffuser element 140 may be placed between LED array panel 132 and wavefront aberrator 100 to diffuse the light emitted by the LED array panel 132 to create a smoother refractive index profile.

In operation, once a desired refractive index profile is determined, computer 136 determines a particular pattern to be illuminated in the LED array panel 132 thereby generating a curing pattern which is directed through diffuser element 140 onto a aberrator 100. By selectively illuminating particular LEDs 135 and 137, for example, within the LED array panel 132, the epoxy (not shown this Figure) is selectively cured. This selective curing creates a predetermined, particular refractive index profile corresponding to the time of exposure of the epoxy as well as the intensity of the exposure. This selective curing results in an aberrator with areas having different indices of refraction. Thus, by varying the intensity and period of illumination of LEDs 135 and 137, for example, the aberrator may be formed to exhibit the desired refractive index profile.

Figure 5:
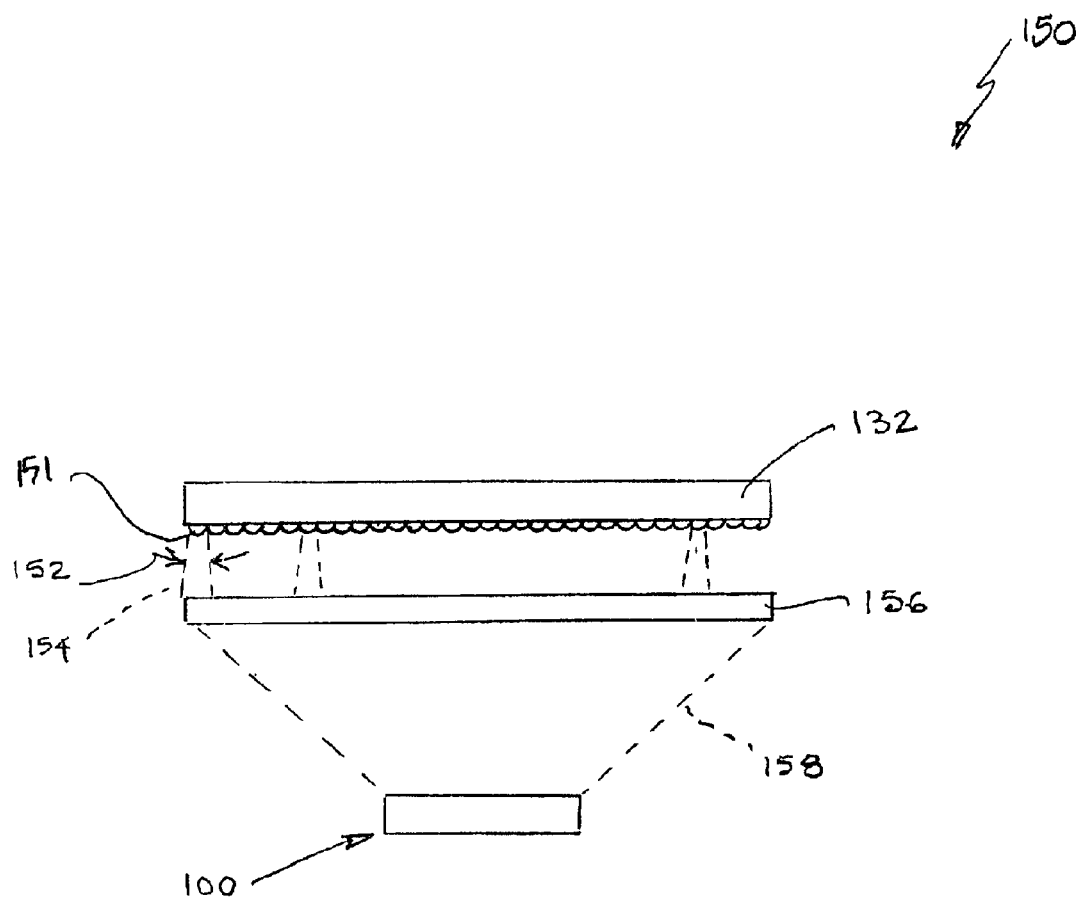
FIG. 5 is a system for manufacturing the wavefront aberrator of the present invention showing an LED array panel generating a curing pattern which is directed through a demagnifier element and onto a wavefront aberrator to cure the epoxy to create a particular refractive index profile.

Referring now to FIG. 5, a system for manufacturing the wavefront aberrator 100 of the present invention is shown in a side view and generally designated 150. System 150 includes an LED array panel 132 where each LED 151 generates a light beam 154 having an diverging angle 152, and the LEDS collectively generate a curing pattern which is directed through a demagnifier imaging element 156 which focusses the curing pattern into light pattern 158 and onto a wavefront aberrator 100 to cure the epoxy (not shown this Figure) within the aberrator 100 to create a particular wavefront profile as shown in FIG. 2. Alternatively, the curing pattern can be magnified, instead of demagnified, to produce a larger area aberrator device.

Figure 6:
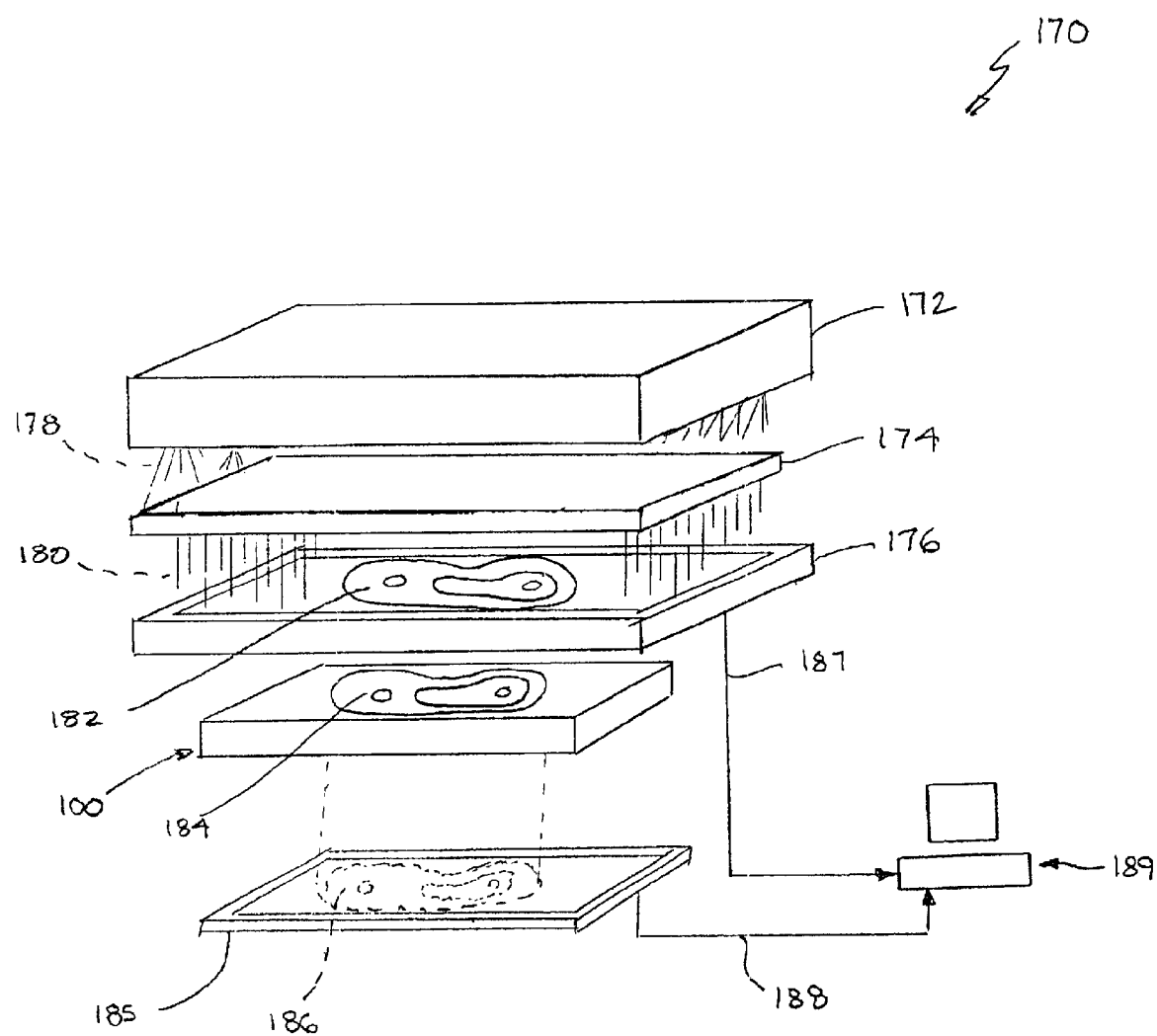
FIG. 6 is a system for manufacturing the wavefront aberrator of the present invention showing a computer controlled liquid crystal display (LCD) generating a curing pattern such that when the LCD is exposed light, light corresponding to the curing pattern is transmitted through the LCD and onto the wavefront aberrator to create a particular refractive index profile.

FIG. 6 depicts a system for manufacturing the wavefront aberrator 100 of the present invention and is generally designated 170. System 170 includes a light source 172 adjacent a diffuser 174 which smooths the light beams 178 and creates uniform intensity light rays 180. Light rays 180 pass through a computer controlled LCD 176 which acts as a spatial light intensity modulator and generates a curing pattern 182 such that when the LCD is exposed light rays 180 from light source 172, light corresponding to the curing pattern 182 is transmitted through the LCD 176 and onto the wavefront aberrator 100 to create a particular refractive index profile 184.

In a preferred embodiment, light source 172 of system 170 is a constant fluence light having a constant intensity across the illuminated surface of the light. For example, light source 172 may contain an array of LEDs, or any other suitable source of illumination. The optical transmissive properties of the LCD can be controlled by applying a variable electrical voltage to an array of electrodes on an LCD device. This provides for the spatial and temporal variation of the intensity of light transmitted through the LCD device to selectively cure the resin 104 in the aberrator 100.

As an addition to system 170, a detector 185 may be placed beneath aberrator 100 to detect the transmitted image 186 through aberrator 100. A feedback interface 188 may connect sensor 185 to computer 189, which may in turn control LCD panel 176. In this manner, a refractive index profile may be determined in the computer 189, implemented in the LCD 176, and verified in sensor 185, thereby ensuring the appropriate wavefront profile was created in aberrator 100. Sensor 185 may include a intensity imager, such as a CCD or a wavefront sensor, such as a Shack-Hartmann sensor.

Although panel 176 is discussed above as a LCD panel, an alternative embodiment could incorporate a photographic negative or positive that may be used to form the refractive index profile 184 in aberrator 100. In this manner, light source 172 would present a constant source of illumination, and the photographic negative or positive containing the refractive index profile 182 would control the spatial and intensity level of illumination reaching aberrator 100 to create the proper refractive index profile 184.

Figure 7:
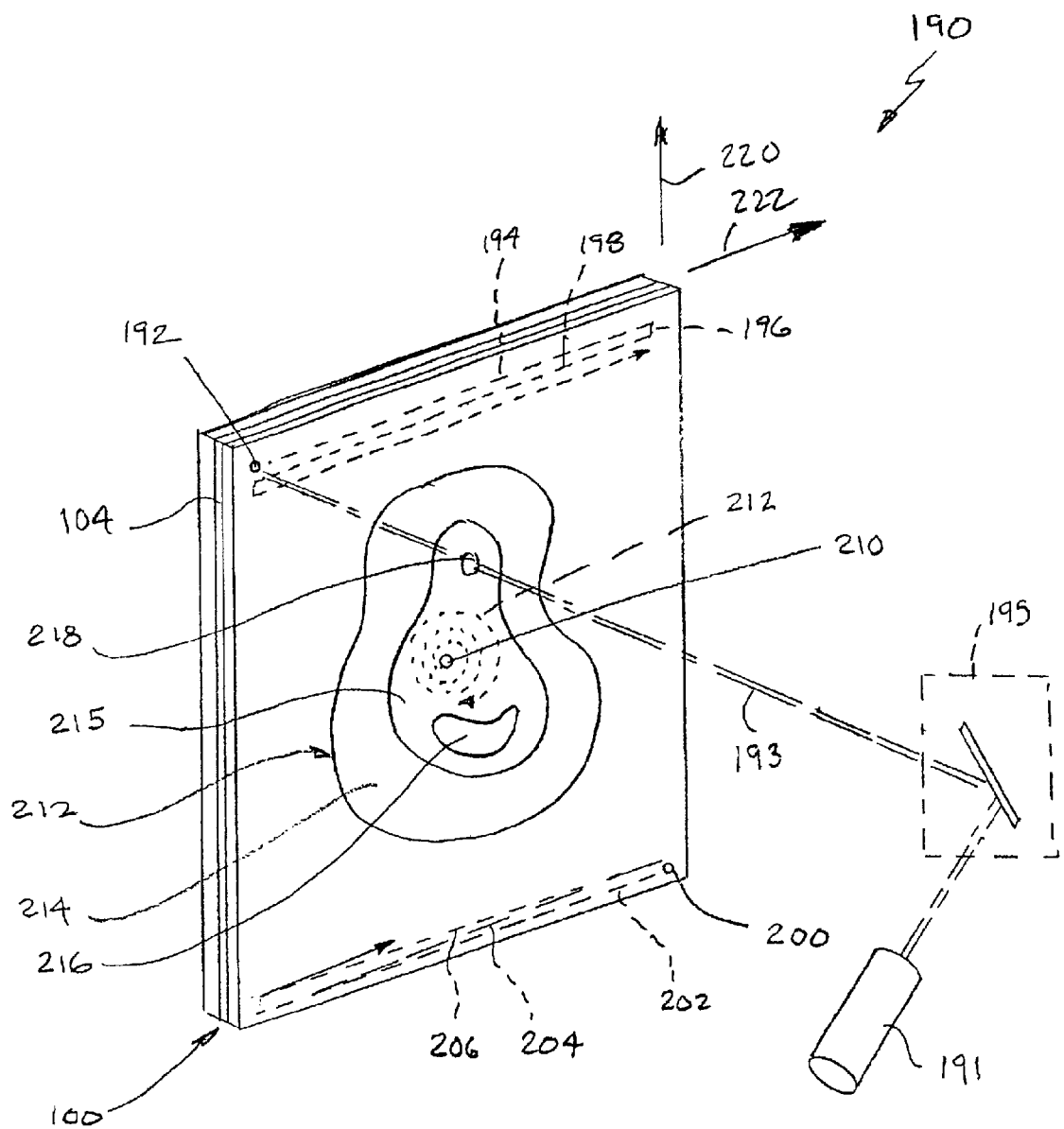
FIG. 7 is a system for manufacturing the wavefront aberrator of the present invention showing point light source that is moved across the surface of the wavefront aberrator at varying speeds and with varying intensities to selectively cure the epoxy to create a particular refractive index profile or arrangement of sub-regions.

Referring now to FIG. 7, an alternative system for manufacturing the wavefront aberrator 100 of the present invention is shown and generally designated 190. System 190 includes a beam scan unit 195 having a laser unit 191 generating a laser beam 193 which forms a point light source ("spot") 192 on aberrator 100 which may include a laser intensity control (not shown). Spot 192 is moved across the surface of the aberrator 100 in a rastering path shown by dashed lines 194, 196, and 198, at varying speeds and with varying intensities to selectively cure the epoxy 104 to create a particular refractive index profile 212 having areas 214, 215, and 216, with different indices of refraction.

Alternatively, a spot 200 may be formed and moved across aberrator 100 in paths 202, 204 and 206. Yet another alternative method of forming refractive index profile 212 includes the formation of spot 210 in the center of aberrator 100, and movement of the spot along an outwardly spiraling path 212. Also, a particular refractive index profile 212 may be traced, or circumscribed in a predetermined area, by laser beam 193 directly forming the boundaries between the areas 214, 215, and 216, for example. In an alternative embodiment, laser beam 193 may remain stationary and the aberrator device 100 may be moved relative to the laser beam 193 such that the spot 210 moves across the surface of the aberrator. Specifically, aberrator 100 may be moved in directions 220 and/or 222 to move the spot 210 across the surface of the aberrator.

ALTERNATIVE EMBODIMENTS

Figure 8:
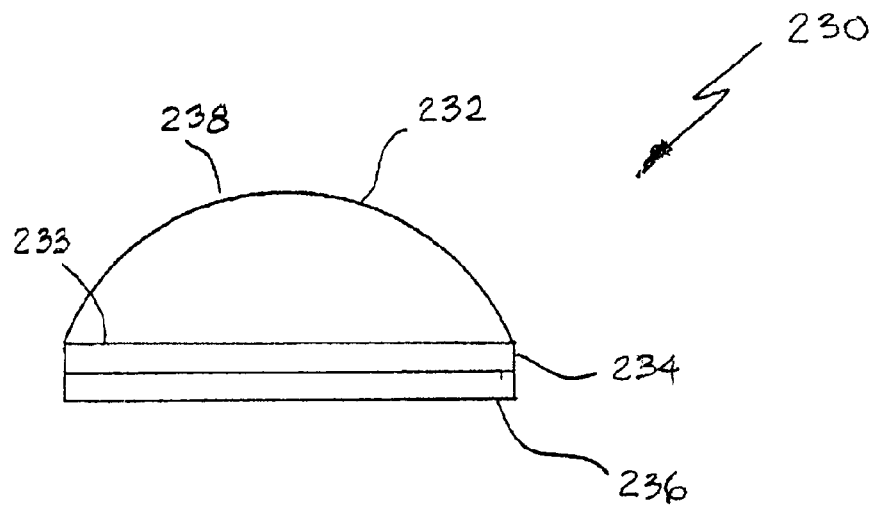
FIG. 8 is a side view of an alternative embodiment of the wavefront aberrator of the present invention incorporating a transparent cover formed in the shape of a lens.

FIG. 8 is a side view of an alternative embodiment of the wavefront aberrator 100 of the present invention incorporating a transparent cover 232 formed in the shape of a lens having a face 233 showing a lens with position focusing power. Alternatively, a lens with negative focussing power and with cylindrical (astigmatism) power may also be incorporated. Sandwiched between face 233 and a transparent cover 236 is a layer 234 of index-changing epoxy. Transparent cover 232 has a spherical refractive surface 238 which functions an optical element. Thus, the cover 232 in combination with epoxy layer 234, provides for an optical element having both focusing and wavefront phase profile characteristics.

Figure 9:
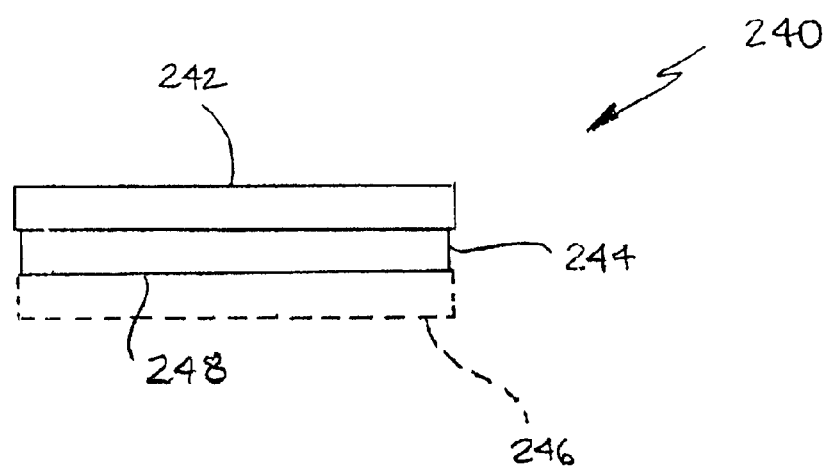
FIG. 9 is a side view of an alternative embodiment of the wavefront aberrator of the present invention formed with a salt window as the lower transparent cover which, when dissolved, provides for an exposed epoxy layer facilitating post curing treatment of the epoxy.

An alternative embodiment of the wavefront aberrator of the present invention is shown in FIG. 9 and generally designated 240. Aberrator 240 includes an upper transparent window 242 and an adjacent layer 244 of index-changing epoxy. A lower transparent window 246 (shown in dashed lines) is formed from a dissolvable salt. Once the refractive index profile has been formed in the layer 244 of epoxy, the salt window 246 may be dissolved. The dissolving nature of window 246 provides for an exposed epoxy layer facilitating post curing treatment of the epoxy, if necessary. Alternatively, windows 242 and 246 may be made of organic materials which are dissolvable in organic solvents.

USES FOR THE PRESENT INVENTION

The present invention may be used to correct aberrations in virtually any optical system. For instance, the present invention may be particularly useful to correct inherent static aberrations in optical imaging systems, such as telescopes, binoculars, or microscopes. The present invention may also be particularly useful by incorporating aberration corrections into eyepieces of optical systems such as telescopes, binoculars, or microscopes.

The aberrator of the present invention may also be used to correct static aberrations in laser beams or associated optics for use in laser ranging, detection, scanning, communication, or tracking instruments. This listing of uses for the present invention is merely exemplary, and is not intended to limit the scope of the invention whatsoever.

While there have been shown what are presently considered to be preferred embodiments of the present invention, it will be apparent to those skilled in the art that various changes and modifications can be made herein without departing from the scope and spirit of the invention.

I claim:

1. A system for making a wavefront aberrator, comprising:
   a layer of optical material comprising a monomer and at least one polymerization initiator;
   two transparent plates, said optical material being contained between said plates; and
   means for controlling the extent of curing of the optical material by a radiation source at predetermined sub-regions inside said optical material to thereby produce a wavefront aberrator having a varied index of refraction.

2. The system of claim 1, further comprising a barrier between said plates confining said optical material within a predetermined volume.

3. A system for making a wavefront aberrator, comprising:
   a layer of optical material comprising a monomer and at least one polymerization initiator, and
   means for controlling the extent of curing of the optical material by a radiation source at predetermined sub-regions inside said optical material to thereby produce a wavefront aberrator having a varied index of refraction;
   said radiation source comprising a LED array panel having a plurality of LED elements operatively disposed to irradiate said optical material.

4. The system of claim 3, said means for controlling the extent of curing comprising a control unit controlling the emission intensity and irradiation duration of each of said LED elements in the LED array panel.

5. The system of claim 4, said means for controlling the extent of curing comprising a de-magnifier operatively disposed to image a predetermined area of the LED array panel onto a predetermined area of the optical material.

6. A system for making a wavefront aberrator, comprising:
   a layer of optical material comprising a monomer and at least one polymerization initiator, and
   means for controlling the extent of curing of the optical material by a radiation source at predetermined sub-regions inside said optical material to thereby produce a wavefront aberrator having a varied index of refraction;
   said radiation source emitting radiation having at least one wavelength within the absorption band of the polymerization initiator;
   said means for controlling the extent of curing comprising a spatial light intensity modulator operatively disposed to control the spatial distribution of the radiation emitted by said radiation source.

7. The system of claim 6, the spatial light intensity modulator being selected from the group consisting of LCD array panel, photographic film, and film with a printed profile for transmitting the radiation.

8. A system for making a wavefront aberrator, comprising:
   a layer of optical material comprising a monomer and at least one polymerization initiator, and
   means for controlling the extent of curing of the optical material by a radiation source at predetermined sub-regions inside said optical material to thereby produce a wavefront aberrator having a varied index of refraction;
   said radiation source comprising a laser unit operatively disposed to direct a laser beam at said predetermined sub-regions inside said optical material;
   said means for controlling the extent of curing comprising a beam scan unit scanning independently in two dimensions to thereby address said predetermined sub-regions inside said optical material.

9. The system of claim 8, said means for controlling the extent of curing further comprising an intensity control for the laser unit.

10. A system for making a wavefront aberrator, comprising:

a layer of optical material comprising a monomer and at least one polymerization initiator; and means for controlling the extent of curing of the optical material by a radiation source at predetermined sub-regions inside said optical material to thereby produce a wavefront aberrator having a varied index of refraction;

said means for controlling the extent of curing comprising a wavefront sensor operatively disposed to measure the radiation transmitted through the optical material.

11. The system of claim 10, said means for controlling the extent of curing further comprising a computer in a feedback loop, said computer monitoring the radiation intensity and controlling the extent of curing by controlling the intensity and the duration of the radiation exposure.

12. The system of claim 1, wherein one of the transparent plates has refractive power selected from the group consisting of positive power with cylindrical power, positive power without cylindrical power, negative power with cylindrical power, negative power without cylindrical power, and combinations thereof.

13. The system of claim 1, at least one of the plates being rigid.

14. The system of claim 1, wherein the at least one of the plates is comprised of a material which is removable by dissolving.

15. The system of claim 1, 3, 6, 8, or 10 in which the monomer is selected from the group consisting of epoxides, urethanes, thiol-enes, acrylates, cellulose esters, and mercapto-esters.

16. A system for making a wavefront aberrator, comprising:

a layer of optical material comprising a light-curable resin, a radiation source comprising a LED array panel having a plurality of LED elements operatively disposed to irradiate said optical material; and a control unit for controlling the extent of curing of the optical material by said radiation source at predetermined sub-regions inside said optical material to thereby produce an wavefront aberrator having a varied index of refraction.

17. A system for making a wavefront aberrator, comprising:

a layer of optical material comprising a light-curable resin, a radiation source comprising a laser unit operatively disposed to irradiate said optical material; and a beam scan unit for controlling the extent of curing of said optical material by said radiation source at predetermined sub-regions inside said optical material to thereby produce a wavefront aberrator having a varied index of refraction.

18. The system of claim 17, further comprising a radiation intensity monitor unit operatively disposed to measure the radiation transmitted through the optical material.

19. The system of claim 18, further comprising a computer in a feedback loop, said computer capable of receiving input from said radiation intensity monitor unit and controlling the extent of curing by controlling said beam scan unit.

20. A system for making a wavefront aberrator, comprising:

a layer of optical material comprising a light-curable resin, a constant fluence radiation source; and a spatial light intensity modulator interposed between said radiation source and said optical material, said spatial light intensity modulator being capable of generating a curing pattern for controlling the extent of curing of said optical material by said constant fluence radiation source at predetermined sub-regions inside said optical material to thereby produce a wavefront aberrator having a varied index of refraction.

21. The system of claim 20 in which said spatial light intensity modulator comprises a computer-controlled LCD.

22. The system of claim 20 further comprising a sensor, said sensor being capable of measuring an image transmitted through said optical material.

23. The system of claim 22 further comprising a computer, said sensor being capable of producing an output signal that is capable of being processed by said computer.

24. The system of claim 1, at least one of the plates being flexible.

25. The system of claim 16, 17, or 20 in which the light curable resin comprises a monomer and a polymerization initiator.

26. The system of claim 25 in which the monomer is selected from the group consisting of epoxides, urethanes, thiol-enes, acrylates, cellulose esters, and mercapto-esters.

* * * * *